(12) United States Patent
Oya et al.

(10) Patent No.: US 9,561,723 B2
(45) Date of Patent: Feb. 7, 2017

(54) REMAINING FUEL LEVEL DISPLAYING METHOD FOR FUEL CELL SYSTEM AND FUEL CELL EQUIPPED VEHICLE

(71) Applicant: TOYOTA JIDOSHA KABUSHIKI KAISHA, Toyota-shi, Aichi-ken (JP)

(72) Inventors: Ryosuke Oya, Toyota (JP); Nobuo Watanabe, Susono (JP); Takahiko Hasegawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/879,867

(22) Filed: Oct. 9, 2015

(65) Prior Publication Data

US 2016/0114682 A1    Apr. 28, 2016

(30) Foreign Application Priority Data

Oct. 27, 2014  (JP) ................................. 2014-217901

(51) Int. Cl.
*B60L 11/18*        (2006.01)
*B60K 35/00*        (2006.01)

(52) U.S. Cl.
CPC ............ *B60K 35/00* (2013.01); *B60L 11/1881* (2013.01); *B60K 2350/1076* (2013.01); *B60K 2350/1092* (2013.01)

(58) Field of Classification Search
CPC ............ B60K 35/00; B60K 2350/1076; B60K 2350/1092

See application file for complete search history.

(56) References Cited

FOREIGN PATENT DOCUMENTS

| JP | 2005-240854 |   | 9/2005 |
| JP | 2005240854 A | * | 9/2005 |
| JP | 2006-112492 |   | 4/2006 |
| JP | 2006112492 A | * | 4/2006 |

* cited by examiner

*Primary Examiner* — Aaron L Troost
(74) *Attorney, Agent, or Firm* — Finnegan, Henderson, Farabow, Garrett & Dunner, LLP

(57) ABSTRACT

If a main stop valve of a fuel gas tank is not opened, it becomes possible to display a remaining level of fuel gas. A remaining fuel level displaying method for the fuel cell system comprises: if the main stop valve is opened, then calculating a remaining level of fuel gas in the fuel gas tank using a pressure value acquired from the pressure sensor, and displaying the calculated remaining level of the fuel gas on a display device, and if the main stop valve is closed, then displaying on the display device a remaining level of the fuel gas that was stored into a memory at a time when the main stop valve was shut off.

10 Claims, 3 Drawing Sheets

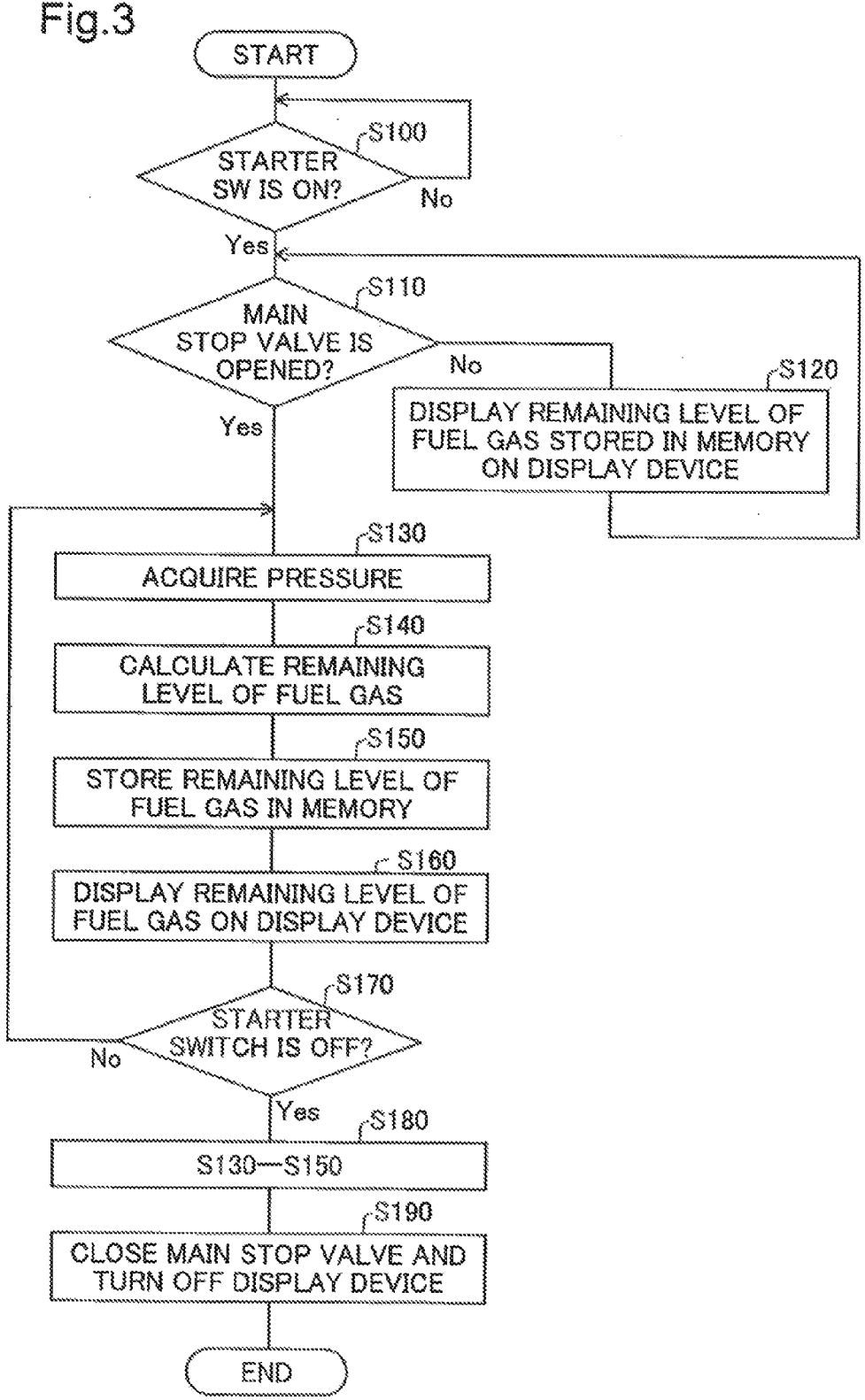

REMAINING FUEL LEVEL DISPLAYING METHOD FOR FUEL CELL SYSTEM AND FUEL CELL EQUIPPED VEHICLE

CROSS-REFERENCE TO RELATED APPLICATIONS

This application claims priority based on Japanese Patent Application No. 2014-217901 filed on Oct. 27, 2014, the disclosure of which is incorporated herein by reference in its entirety.

BACKGROUND

Field

This invention relates to a remaining fuel level displaying method for a fuel cell system and a fuel cell equipped vehicle.

Related Art

JP2006-112492A discloses a fuel supply device that releases a fuel from some of multiple fuel tanks. In this fuel supply device, a main stop valve of one of the fuel tanks is opened at the time of start-up to determine whether the fuel tank is filled with fuel. If filling with the fuel is determined, main stop valves of all the fuel tanks are opened. Then, the fuel is released from all the fuel tanks, a remaining fuel level is detected based on the state of the released fuel, and the detected remaining fuel level is displayed on a remaining level indicator.

In the conventional fuel supply device, the main stop valve of one fuel tank is opened at the time of start-up to determine whether the fuel tank is filled with the fuel and a remaining fuel level is displayed on the remaining level indicator. By contrast, in a fuel cell equipped vehicle, the main stop valve of the fuel tank is opened after a starter switch is turned on. This causes a problem in the fuel cell equipped vehicle in that a remaining fuel level cannot be displayed on the remaining level indicator in a period from when the starter switch (also called an "ignition switch") is turned on to when the main stop valve of the fuel tank is opened.

SUMMARY

This invention has been made to solve at least part of the aforementioned problem and can be implemented in the following aspects.

(1) According to one aspect of the invention, there is provided a remaining fuel level displaying method for a fuel cell system comprising a pressure sensor provided between a fuel cell and a main stop valve of a fuel gas tank. The remaining fuel level displaying method for the fuel cell system comprises: if the main stop valve is opened, then calculating a remaining level of fuel gas in the fuel gas tank using a pressure value acquired from the pressure sensor, and displaying the calculated remaining level of the fuel gas on a display device, and if the main stop valve is closed, then displaying on the display device the calculated remaining level of the fuel gas that was last stored into a memory at a time before the main stop valve was shut off.

According to this aspect, if the main stop valve is closed, the remaining level of the fuel gas, in the fuel gas tank calculated using the pressure value acquired from the pressure sensor, is not displayed on the display device. Instead, the remaining level of the fuel gas, was stored into a memory at a time when the main stop valve was shut off, is displayed on the display device. Thus, even if the main stop valve is not opened, and a remaining level of the fuel gas in the fuel gas tank cannot be calculated using a pressure from the pressure sensor, a remaining level of the fuel gas can still be displayed on the display device.

(2) The remaining fuel level displaying method for the fuel cell system according to the aspect before may further comprise: if a starter switch for starting operation of the fuel cell system is turned off, then calculating a remaining level of the fuel gas in the fuel gas tank before the main stop valve is shut off, and storing the calculated remaining level of the fuel gas in the memory. According to this aspect, if the starter switch is turned off to stop the fuel cell system, a remaining level of the fuel gas in the fuel gas tank at a time before the main stop valve is shut off can be calculated and the calculated remaining level can be stored in the memory.

(3) The remaining fuel level displaying method for the fuel cell system according to the aspect before, may further comprise: if the main stop valve is opened, then storing the calculated remaining level of the fuel gas in the memory each time the remaining level of the fuel gas in the fuel gas tank is calculated. According to this aspect, while the fuel cell system is stopped for reason except turning off the starter switch, a remaining level of the fuel gas in the fuel gas task is stored in the memory. Thus, even in this case, this value in the memory can still be used.

(4) The remaining fuel level displaying method for the fuel cell system according to the aspect before may further comprising: measuring a temperature of the fuel gas in the fuel gas tank, and wherein the calculating a remaining level of the fuel gas in the fuel gas tank is performed using the measured temperature of the fuel gas and the pressure value. The pressure of gas depends on a temperature. According to this aspect, a remaining level of the fuel gas can be calculated accurately.

(5) The remaining fuel level displaying method for the fuel cell system according to the aspect before may further comprising: measuring an ambient temperature, and wherein the calculating a remaining level of the fuel gas in the fuel gas tank is performed using the ambient temperature and the pressure value while the ambient temperature is regarded as a temperature of the fuel gas in the fuel gas tank. In a time except when the fuel gas is poured into the fuel gas tank, the temperature of the fuel gas tank is in equilibrium with an ambient temperature. According to this aspect, even if there are multiple fuel gas tanks, it is not required to provide temperature sensors for the respective fuel gas tanks.

(6) According to one aspect of the invention, there is provided a fuel cell equipped vehicle. The fuel cell equipped vehicle comprises: a fuel cell; a fuel gas tank that stores fuel gas to be supplied to the fuel cell; a fuel gas supply pipe through which the fuel gas is supplied from the fuel gas tank to the fuel cell; a main stop valve provided between the fuel gas tank and the fuel gas supply pipe; a pressure sensor that measures a pressure of the fuel gas in the fuel gas supply pipe between the main stop valve and the fuel cell; a controller that calculates a remaining level of the fuel gas in the fuel gas tank using a pressure acquired from the pressure sensor, the controller having a memory for storing a remaining level of the fuel gas; a display device that displays a remaining level of the fuel gas; and a starter switch of the fuel cell equipped vehicle, wherein if the main stop valve is opened, the controller calculates a remaining level of the fuel gas in the fuel gas tank using a pressure value acquired from the pressure sensor, stores the calculated remaining level of the fuel gas in the memory, and makes the display device display the calculated remaining level of the fuel gas, and in a state where the starter switch is switched from off to on and before the main stop valve is opened, the controller makes the display device display the calculated remaining level of the fuel gas that was last stored into a memory at a time before the main stop valve was shut off. According to this aspect, even in a state where the starter switch is switched from off to on and before the main stop valve is opened, an accurate remaining level of the fuel gas can still be displayed on the display device.

This invention can be implemented in various aspects. For example, this invention can be implemented in aspects including a fuel gas supply device in addition to a remaining fuel level displaying method for a fuel cell system and a fuel cell equipped vehicle.

BRIEF DESCRIPTION OF THE DRAWINGS

FIG. 3 is a flowchart showing the operation of this embodiment.

DESCRIPTION OK THE EMBODIMENTS

Figure 1:
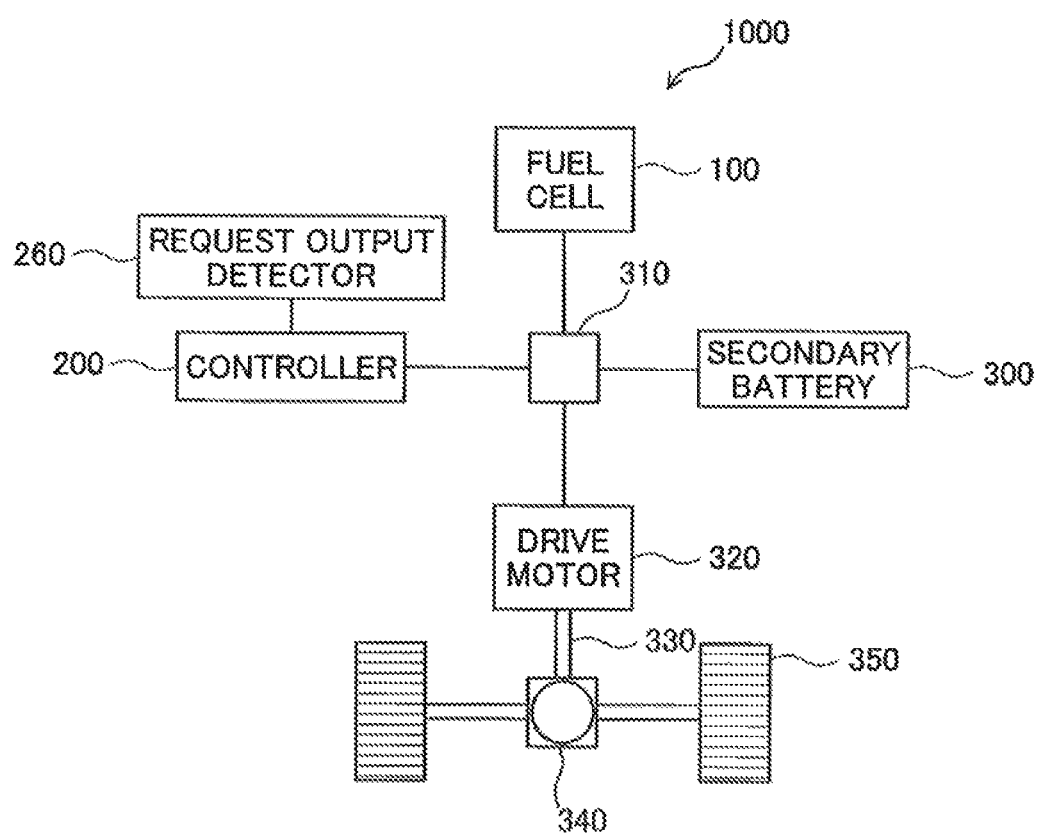
FIG. 1 is an explanatory view showing a fuel cell equipped vehicle equipped with a fuel cell.

FIG. 1 is an explanatory view showing a fuel cell equipped vehicle 1000 equipped with a fuel cell. The fuel cell equipped vehicle 1000 includes a fuel cell 100, a controller 200 (also called an electronic control unit (ECU)), a request output detector 260, a secondary battery 300, a power distribution controller 310, a drive motor 320, a drive shaft 330, a power distribution gear 340, and wheels 350.

The fuel cell 100 is a power generator to draw power by making fuel gas and oxidizing gas react electrochemically. The controller 200 controls respective operations of the fuel cell 100, the secondary battery 300, and the power distribution controller 310 based on a request output value acquired from the request output detector 260. The request output detector 260 detects step-in amount of an accelerator (not shown in the drawings) of the fuel cell equipped vehicle 1000 and detects a request output from a driver based on the magnitude of the step-in amount. On the basis of the request output, the controller 200 calculates a requested amount of power the fuel cell 100 is requested to generate. For the secondary battery 300, a nickel-hydrogen battery or a lithium-ion battery is applicable, for example. For charge of the secondary battery 300, the secondary battery 300 can be charged directly with power output from the fuel cell 100, for example. Alternatively, the secondary battery 300 can be charged with the kinetic energy of the fuel cell equipped vehicle 1000 recovered by the drive motor 320 during deceleration of the fuel cell equipped vehicle 1000. In response to receipt of an order from the controller 200, the power distribution controller 310 controls distribution of power to be output from the fuel cell 100 to the drive motor 320 and power to be output from the secondary battery 300 to the drive motor 320. Also, in response to receipt of an order from the controller 200, the power distribution controller 310 charges the secondary battery 300 with power recovered by the drive motor 320 during deceleration of the fuel cell equipped vehicle 1000. The drive motor 320 functions as an electric motor to drive the fuel cell equipped vehicle 1000. Also, the drive motor 320 functions as a power generator to recover the kinetic energy of the fuel cell equipped vehicle 1000 as electric energy during deceleration of the fuel cell equipped vehicle 1000. The drive shaft 330 is a rotary shaft used to transmit driving force generated by the drive motor 320 to the power distribution gear 340. The power distribution gear 340 distributes the driving force between the right and left wheels 350.

Figure 2:
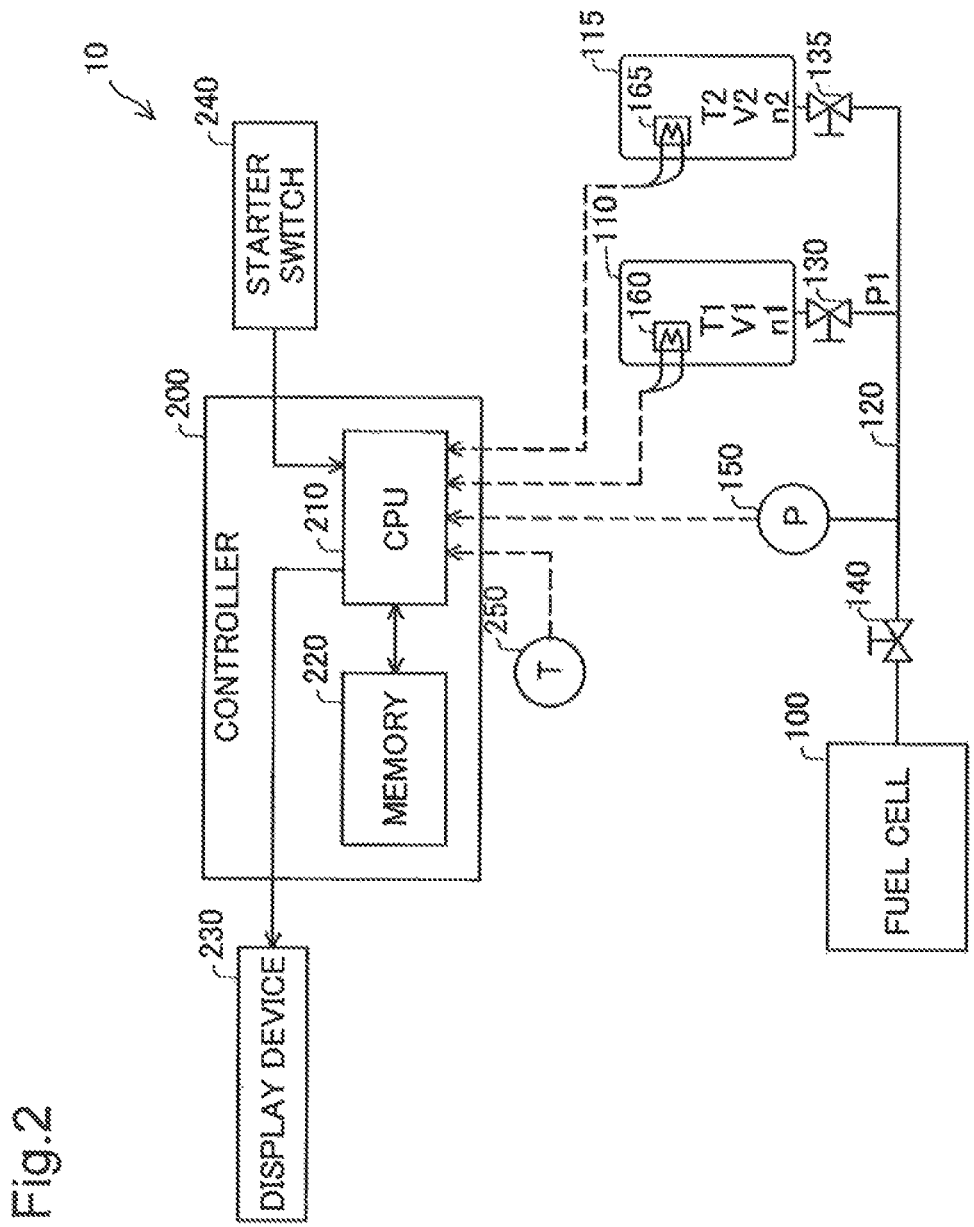
FIG. 2 is an explanatory view showing a supply system for fuel gas in a fuel cell system.

FIG. 2 is an explanatory view showing a supply system for fuel gas in a fuel cell system 10. In addition to the supply system for the fuel gas, the fuel cell system 10 includes a discharge system for the fuel gas, a supply system and a discharge system for oxidizing gas, and a cooling system. The description herein only relates to the supply system for the fuel gas and does not refer to a discharge system for different fuel gas, the supply system and the discharge system for the oxidizing gas, and the cooling system.

The fuel cell system 10 includes the fuel cell 100, a first fuel gas tank 110, a second fuel gas tank 115, a fuel gas supply pipe 120, a first main stop valve 130, a second main stop valve 135, a regulator 140, a pressure sensor 150, a first temperature sensor 160, a second temperature sensor 165, the controller 200, a display device 230, a starter switch 240 (also called an "ignition switch 240"), and an ambient temperature sensor 250. The first and second fuel gas tanks 110 and 115 store fuel gas to be supplied to the fuel cell 100. In this embodiment, hydrogen is used as the fuel gas. The first and second fuel tanks 110 and 115 are connected to the fuel cell 100 through the fuel gas supply pipe 120. The first main stop valve 130 is provided between the first fuel gas tank 110 and the fuel gas supply pipe 120. The second main stop valve 135 is provided between the second fuel gas tank 115 and the fuel gas supply pipe 120. Being shut off the main stop valves 130 and 135 interrupts downstream supply of the fuel gas through the main stop valves 130 and 135. The fuel gas supply pipe 120 is provided with the regulator 140. The regulator 140 adjusts the pressure of the fuel gas to be supplied to the fuel cell 100. The pressure sensor 150 is provided between the regulator 140 and the first main stop valve 130 and between the regulator 140 and the second main stop valve 135. The pressure sensor 150 measures the pressure of the fuel gas in the fuel gas supply pipe 120. When the first and second main stop valves 130 and 135 are opened, the pressure of the fuel gas in the fuel gas supply pipe 120 is the same as the pressure of the fuel gas in each of the first and second fuel gas tanks 110 and 115. The first fuel gas tank 110 is provided with the first temperature sensor 160. The second fuel gas tank 115 is provided with the second temperature sensor 165.

The controller 200 includes a computing unit 210 (also called a "CPU 210") and a memory 220. The computing unit 210 calculates a remaining level of the fuel gas in each of the first and second fuel gas tanks 110 and 115 using a pressure P1 measured by the pressure sensor 150, a temperature T1 in the first fuel gas tank 110 measured by the first temperature sensor 160, and a temperature T2 in the second fuel gas tank 115 measured by the second temperature sensor 165. A volume V1 of the first fuel gas tank 110 and a volume V2 of the second fuel gas tank 115 are determined when the first and second fuel gas tanks 110 and 115 are designed or manufactured. The temperatures T1 and T2 in the first and second fuel gas tanks 110 and 115 can be acquired from the first and second temperature sensors 160 and 165 respectively. Thus, a remaining level n1 of the fuel gas in the first fuel gas tank 110 and a remaining level n2 of the fuel gas in the second fuel gas tank 115 can be calculated using corresponding formulas given below:

$$n1=(P1*V1)/(R*T1) \qquad (1)$$

$$n2=(P1*V2)/(R*T2) \qquad (2)$$

where R is a gas constant. In formulas (1) and (2), to simplify the calculations, the value of n is calculated using the equation of state of ideal gas (PV=nRT). Alternatively, the values of the remaining levels n1 and n2 of the fuel gas may be obtained using the van der Waals equation of state $((P+n^2a/v^2)*(V-nb)=nRT)$ or a different equation of state of gas.

The memory 220 stores the calculated values of the remaining levels n1 and n2 of the fuel gas. The starter switch 240 is a main switch of the fuel cell equipped vehicle 1000. Turning on the starter switch 240 starts the fuel cell system 10 for the fuel cell equipped vehicle 1000. Turning off the starter switch 240 stops the fuel cell system 10 for the fuel cell equipped vehicle 1000. The memory 220 may be formed as a nonvolatile memory so as not to erase the content of the memory 220 after the starter switch 240 of the fuel cell equipped vehicle 1000 is turned off. The memory 220 may also be configured in a manner such that a voltage is supplied to the memory 220 and the content of the memory 220 is retained after the starter switch 240 is turned off. The display device 230 displays a remaining level of the fuel gas. After the starter switch 240 is turned off, the display device 230 is turned off and display of a remaining level of the fuel gas disappears.

If the first and second fuel gas tanks 110 and 115 are filled with fuel gas supplied from outside, the controller 200 calculates the values of the remaining levels n1 and n2 of the fuel gas in the first and second fuel gas tanks 110 and 115 using the pressure P1 measured by the pressure sensor 150, the temperatures T1 and T2 measured by the first and second temperature sensors 160 and 165, and the volumes V1 and V2 of the first and second fuel gas tanks 110 and 115. The controller 200 stores the calculated values of the remaining levels n1 and n2 of the fuel gas in the memory 220.

FIG. 3 is a flowchart showing the operation of this embodiment. If the starter switch 240 of the fuel cell equipped vehicle 1000 is turned on in step S100, the controller 200 starts the fuel cell system 10 and opens the first and second main stop valves 130 and 135. In response, process and operation of activating the fuel cell system 10 are started. In step S110, the controller 200 determines whether the first and second main stop valves 130 and 135 have been opened. Opening the first and second main stop valves 130 and 135 increases the pressure of the fuel gas existing downstream relative to the main stop valves 130 and 135. Thus, opening of the first and second main stop valves 130 and 135 may be determined by determining whether the pressure P1 has been increased using the pressure sensor 150, for example. Alternatively, opening of the first and second main stop valves 130 and 135 may be determined based on a time elapsed after the starter switch 240 is turned on. If the first and second main stop valves 130 and 135 are not opened, the controller 200 shifts processing to step S120 to display a remaining level of the fuel gas stored in the memory 220 on the display device 230. This remaining level of the fuel gas is a level stored in the memory 220 resulting from a process in step S180 described later. Meanwhile, if the first and second main stop valves 130 and 135 have been opened, the controller 200 shifts the processing to step S130.

In step S130, the controller 200 acquires the pressure P1 of the fuel gas in the fuel gas supply pipe 120 from the pressure sensor 150. If the first and second main stop valves 130 and 135 are opened, the acquired pressure P1 is the same as the pressure of the fuel gas in each of the first and second fuel gas tanks 110 and 115. In step S140, the controller 200 calculates the levels (remaining levels) n1 and n2 of the fuel gas in the first and second fuel gas tanks 110 and 115 using the value of the pressure P1. If the temperatures T1 and T2 of the fuel gas in the first and second fuel gas tanks 110 and 115 are measured using the first and second temperature sensors 160 and 165, the controller 200 can easily calculate the levels (remaining levels) n1 and n2 of the fuel gas in the first and second fuel gas tanks 110 and 115 using the pressure P1, the temperatures T1 and T2, and the volumes V1 and V2 of the first and second fuel gas tanks 110 and 115. In a time except when the fuel gas is poured into the first and second fuel gas tanks 110 and 115, for example, in a normal operating state of the fuel cell system 10, the temperatures T1 and T2 are substantially in equilibrium with an ambient temperature. In this case, the ambient temperature can be regarded as the temperatures T1 and T2. Thus, the ambient temperature measured by the ambient temperature sensor 250 may be used instead of the temperatures T1 and T2 of the first and second temperature sensors 160 and 165. In this case, the temperatures T1 and T2 of the first and second temperature sensors 160 and 165 may not be used. In step S150, the controller 200 stores the values of the levels (remaining levels) n1 and n2 of the fuel gas in the first and second fuel gas tanks 110 and 115 in the memory 220. In step S160, the controller 200 makes the display device 230 display the levels (remaining levels) of the fuel gas in the first and second fuel gas tanks 110 and 115. The controller 200 performs the processes from step S130 to step S160 repeatedly at given intervals such as every one minute or every five minutes. During operation of the fuel cell equipped vehicle 1000, the levels (remaining levels) of the fuel gas in the first and second fuel gas tanks 110 and 115 are only required to be displayed on the display device 230. Thus, the controller 200 may omit the process in step S150. However, by performing the process in step S150, the values of the remaining levels n1 and n2 of the fuel gas in the first and second fuel gas tanks 110 and 115 are stored in the memory 220 while the fuel cell system 10 is stopped for reason except turning off the starter switch 240. Thus, even in this case, the controller 200 can still use the values of the remaining levels n1 and n2 of the fuel gas in the first and second fuel gas tanks 110 and 115 stored in the memory 220.

If the starter switch 240 is turned off in step S170, the controller 200 shifts the processing to step S180 to performs, once again, processes same as those having been performed from step S130 to S150. Then, the controller 200 stores the values of the levels (remaining levels) n1 and n2 of the fuel gas in the first and second fuel gas tanks 110 and 115 in the memory 220. If the processes from step S130 to S160 are repeated at short intervals, the values of the levels (remaining levels) n1 and n2 of the fuel gas in the first and second fuel gas tanks 110 and 115 stored in step S180 are substantially the same as the values of the levels (remaining levels) n1 and n2 of the fuel gas in the first and second fuel gas tanks 110 and 115 stored in the memory 220 in step S150 immediately before the starter switch 240 is turned off. In this case, the controller 200 may omit the process in step S180. In step S190, the controller 200 closes the first and second main stop valves 130 and 135 and turns off the display device 230. The controller 200 may turn off the display device 230 before performing the process in step S180.

According to the aforementioned embodiment, when the first and second main stop valves 130 and 135 are opened, the controller 200 makes the computing unit 210 calculate the values of the remaining levels n1 and n2 of the fuel gas in the first and second fuel gas tanks 110 and 115 using a pressure value acquired from the pressure sensor 150. Then, the controller 200 stores the calculated values of the remaining levels n1 and n2 of the fuel gas in the memory 220 and displays the remaining levels of the fuel gas on the display device 230. If the first and second main stop valves 130 and 135 are still closed at a time such as one immediately after the starter switch 240 is turned on, the values of remaining levels of the fuel gas in the first and second fuel gas tanks 110 and 115 calculated using a pressure value acquired from the pressure sensor 150 are not displayed on the display device 230. Instead, the values of remaining levels of the fuel gas stored in the memory 220 at a time when the first and second main stop valves 130 and 135 are shut off are displayed on the display device 230. Thus, even if the first and second main stop valves 130 and 135 are not opened, and the values of remaining levels of the fuel gas in the fuel gas tanks cannot be calculated using a pressure value from the pressure sensor 150, a remaining level of the fuel gas can still be displayed on the display device 230. In particular, even in a state immediately after the starter switch 240 is switched from off to on and before the first and second main stop valves 130 and 135 are opened, an accurate remaining level of the fuel gas can still be displayed on the display device.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

What is claimed is:

1. A remaining fuel level displaying method for a fuel cell system comprising a pressure sensor provided between a fuel cell and a main stop valve of a fuel gas tank, comprising:
    controlling the main stop valve to be opened or closed;
    if the main stop valve is opened, then calculating a remaining level of fuel gas in the fuel gas tank using a pressure value acquired from the pressure sensor, and displaying the calculated remaining level of the fuel gas on a display device, and
    if the main stop valve is closed, then displaying on the display device the calculated remaining level of the fuel gas that was last stored into a memory at a time before the main stop valve was shut off.

2. The remaining fuel level displaying method for the fuel cell system in accordance with claim 1, further comprising:
    if a starter switch for starting operation of the fuel cell system is turned off, then calculating a remaining level of the fuel gas in the fuel gas tank before the main stop valve is shut off, and storing the calculated remaining level of the fuel gas in the memory.

3. The remaining fuel level displaying method for the fuel cell system in accordance with claim 1, further comprising:
    if the main stop valve is opened, then storing the calculated remaining level of the fuel gas in the memory each time the remaining level of the fuel gas in the fuel gas tank is calculated.

4. The remaining fuel level displaying method for the fuel cell system in accordance with claim 1, further comprising:
    measuring a temperature of the fuel gas in the fuel gas tank, and wherein
    the calculating a remaining level of the fuel gas in the fuel gas tank is performed using the measured temperature of the fuel gas and the pressure value.

5. The remaining fuel level displaying method for the fuel cell system in accordance with claim 1, further comprising:
    measuring an ambient temperature, and wherein
    the calculating a remaining level of the fuel gas in the fuel gas tank is performed using the ambient temperature and the pressure value while the ambient temperature is regarded as a temperature of the fuel gas in the fuel gas tank.

6. A fuel cell equipped vehicle comprising:
    a fuel cell;
    a fuel gas tank that stores fuel gas to be supplied to the fuel cell;
    a fuel gas supply pipe through which the fuel gas is supplied from the fuel gas tank to the fuel cell;
    a main stop valve provided between the fuel gas tank and the fuel gas supply pipe;
    a pressure sensor that measures a pressure of the fuel gas in the fuel gas supply pipe between the main stop valve and the fuel cell;
    a controller that calculates a remaining level of the fuel gas in the fuel gas tank using a pressure acquired from the pressure sensor, the controller having a memory for storing a remaining level of the fuel gas;
    a display device that displays a remaining level of the fuel gas; and
    a starter switch of the fuel cell equipped vehicle, wherein
    if the main stop valve is opened, the controller calculates a remaining level of the fuel gas in the fuel gas tank using a pressure value acquired from the pressure sensor, stores the calculated remaining level of the fuel gas in the memory, and makes the display device display the calculated remaining level of the fuel gas, and
    in a state where the starter switch is switched from off to on and before the main stop valve is opened, the controller makes the display device display the calculated remaining level of the fuel gas that was last stored into a memory at a time before the main stop valve was shut off.

7. The fuel cell equipped vehicle in accordance with claim 6, wherein
    if a starter switch is turned off, the controller calculates a remaining level of the fuel gas in the fuel gas tank before the main stop valve is shut off, and stores the calculated remaining level of the fuel gas in the memory.

8. The fuel cell equipped vehicle in accordance with claim 6, wherein
    if the main stop valve is opened, then the controller stores the calculated remaining level of the fuel gas in the memory each time the remaining level of the fuel gas in the fuel gas tank is calculated.

9. The fuel cell equipped vehicle in accordance with claim 6, further comprising:
    a temperature sensor that measures a temperature of the fuel gas in the fuel gas tank; and wherein
    the controller calculates a remaining level of the fuel gas in the fuel gas tank using the measured temperature of the fuel gas and the pressure value.

10. The fuel cell equipped vehicle in accordance with claim 6, further comprising:
    an ambient temperature sensor that measures an ambient temperature; and wherein
    the controller calculates a remaining level of the fuel gas in the fuel gas tank using the ambient temperature and the pressure value while the ambient temperature is regarded as a temperature of the fuel gas in the fuel gas tank.

\* \* \* \* \*